(12) United States Patent
Martinik

(10) Patent No.: US 9,007,383 B2
(45) Date of Patent: Apr. 14, 2015

(54) CREATING PRESENTATIONS BY CAPTURING CONTENT OF A SIMULATED SECOND MONITOR

(71) Applicant: Ivo Martinik, Ostrava-Poruba (CZ)

(72) Inventor: Ivo Martinik, Ostrava-Poruba (CZ)

(73) Assignee: Vysokáškola báňská—Technická Univerzita Ostrava

( * ) Notice: Subject to any disclaimer, the term of this patent is extended or adjusted under 35 U.S.C. 154(b) by 143 days.

(21) Appl. No.: 13/705,985

(22) Filed: Dec. 5, 2012

(65) Prior Publication Data

US 2014/0152677 A1   Jun. 5, 2014

(51) Int. Cl.
  *G06F 13/14* (2006.01)
  *G06T 1/00* (2006.01)

(52) U.S. Cl.
  CPC ........................................ *G06T 1/00* (2013.01)

(58) Field of Classification Search
  CPC ............ G09G 5/14; G09G 2340/0407; G09G 2320/103; G09G 2360/02; G09G 5/005; G06F 3/1423; G06F 3/1446; G06F 3/14; G06F 9/455
  USPC ......................................................... 345/520
  See application file for complete search history.

(56) References Cited

U.S. PATENT DOCUMENTS

| | | | |
|---|---|---|---|
| 4,555,775 A | 11/1985 | Pike | |
| 4,651,146 A | 3/1987 | Lucash et al. | |
| 5,113,180 A | 5/1992 | Gupta et al. | |
| 6,337,717 B1 | 1/2002 | Nason et al. | |
| 6,573,915 B1 | 6/2003 | Sivan et al. | |
| 7,043,697 B1 | 5/2006 | Jensen et al. | |
| 7,139,107 B2 | 11/2006 | Kuo et al. | |
| 7,158,140 B1 | 1/2007 | Klebanov | |
| 7,650,603 B2 | 1/2010 | Green | |
| 7,739,417 B2 | 6/2010 | Liu et al. | |
| 7,797,616 B2 | 9/2010 | Jensen et al. | |
| 7,889,241 B2 * | 2/2011 | Inoue et al. | 348/222.1 |
| 7,903,295 B2 | 3/2011 | Kuo et al. | |
| 8,736,700 B2 * | 5/2014 | Cote et al. | 348/222.1 |
| 2006/0061516 A1 | 3/2006 | Campbell et al. | |
| 2007/0015118 A1 | 1/2007 | Nickell et al. | |
| 2010/0321395 A1 * | 12/2010 | Maciesowicz et al. | 345/502 |

* cited by examiner

*Primary Examiner* — Hau Nguyen
(74) *Attorney, Agent, or Firm* — Standley Law Group LLP

(57) ABSTRACT

A method whereby a second display device is simulated using software so that images may be directed by a personal computer or other electronic device to appear on the simulated display. The software may then be configured to display images directed to such a simulated display in a portion of the primary display, allowing the user of the method to monitor the simulated display and capture images from the simulated display using an automated capture algorithm to capture and store the image for future use. The presenter or user of the method may make adjustments to the capture parameters, via a control interface, which is viewed on the primary display device.

14 Claims, 10 Drawing Sheets

CREATING PRESENTATIONS BY CAPTURING CONTENT OF A SIMULATED SECOND MONITOR

BACKGROUND AND SUMMARY OF THE INVENTION

Most personal computers used today support the connection of a second display device. A listing of such devices may include an additional computer monitor, a large screen display device or projector used to display information to an audience, or even a television display that has a compatible connection. There is little doubt that the effectiveness of instructional materials such as classroom, business and other presentations are improved with illustrations. For best effect and retention of audience interest, illustrations should be consecutive, showing incremental changes in the material displayed and perhaps most importantly, show the image with sufficient clarity for the viewer to be able to discern the information contained in the presentation.

When a presenter wishes to generate these illustrations from a presentation or other source of material which was developed for display on a second display device, as previously described, but does not have access to a second device, he or she may still desire to make changes to the source material. Making such changes and then generating illustrations can be time consuming and difficult, detracting from the ultimate goal, that being to communicate a concept to an audience. The presenter may have to adapt an existing source material to be viewed to the primary display of a computer. This may result in the inability to see controls or notes that would normally be displayed on the primary display of a computer. A presenter may also find it difficult to create a presentation for later use in an environment which has display devices unlike those available to the presenter at his or her normal workplace. Examples of such devices may be display projectors and television monitors that have a variety of different display aspect ratios. In order to create a presentation that is displayed correctly on such a display device, a presenter may have to create or make adjustments to a presentation after connecting a computer to the same or similar devices. This process is inefficient and does not allow a presenter to confidently create a presentation in advance. A solution to this inefficiency is the creation of simulated monitor which the presenter or user of the computer may configure to be of the same type or configuration of the type of display device upon which a presentation will be displayed.

Even after the presenter makes such changes to his material, he still must go through a process of selecting and capturing screen images. Past methods of capturing screen images have included using print screen functionality often contained in computer operating systems. Such an approach requires the presenter to identify an image displayed on a computer screen while using a series of keystrokes to "copy" an image and "paste" it into a document. There are also programs that allow a user to capture screen images from within a software user interface that may be configured to store the selected images without the copy and paste steps described above. Examples of such solutions are computer programs such as Snagit® (www.techsmith.com) and Captivate® (www.adobe.com/captivate). Despite the elimination of the "cut" and "paste" steps, users of these existing software programs are still required to manually select and initiate the storage of images created using a program such as PowerPoint® or other, similar computer programs. A major shortcoming of this approach is that it requires the user to create the images ahead of time and in a manner that each image shows an incremental step of the information to be conveyed. Further, using these methods require the user to wait for an image to appear, and then pause to select and copy the image for storage. This process may be that much more difficult and frustrating if the person trying to capture images had to start a presentation, wait for an image to appear, capture that image, and then stop the presentation so that he could paste the image into another document.

An experienced presenter will realize that it is important that illustrative images are captured frequently enough that they do not confuse a viewer. In order for a series of images to best portray the concepts presented during a presentation, those images should convey incremental images that represent a series of steps from one concept to the next. Failure to create incremental images results in a series of summary images which, while they may make good key points, do not provide the viewer with the incremental pieces of information needed to bridge the gap from one concept image to the next.

A solution to the problem of the need for high levels of user involvement required with the image capture approaches just described has been the use of a video camera to record an entire presentation. This approach allows for capture of images as they are displayed on a computer monitor or an overhead projector. While this solves the problem of capturing enough images to avoid the problem of large gaps from one summary image to the next, it suffers from the problem of capturing much more information than is needed, capturing hundreds or even thousands of nearly identical images. As a result of the large number of images, the video files obtained from the use of a video camera are extremely large and difficult to easily store and deliver to potential audiences. In the case of the presenter only having a single monitor is that the image to be recorded is only able to be displayed on what is often a relatively small display which may create difficulties for a video camera's ability to focus at such a short distance. The highly compressed video images (frames) of video files are also of much lower quality than bitmap images captured directly from a computer system.

Other methods of capturing displayed images employ external video capture devices (video grabbing cards) in conjunction with driver software to capture images from a video source. An example of this type of technology is the Encore ENMVG-2 Audio Video Grabber device. These types of external devices require the operator to capture the entire video recording or to select small segments of a video recording and as a result, still suffer from the large file size and image quality problems present with the use of the video camera method previously described.

The present invention provides an improvement to the process whereby the user of the invention may capture images from a computerized device for later use when the user wishes to capture such images from a second monitor but does not have a second monitor available for connection or such a connection would be inconvenient or impossible. The invention allows the user of the invention to capture said images automatically and without continuous actions by the user. The invention allows the user of the invention to optimize the capture of said images so as to capture a sufficient number of images to allow a later viewer of the images to understand the material presented without capturing such a large number of images that the resultant image data file becomes difficult to store and transmit to a later viewer.

In a computer system embodying the principles of the invention, the problems caused by a user of the computer system who wishes to display images to a secondary display device when no such device is available or convenient to connect to the computer system are addressed by providing a method whereby the computer is set up as if it had two displays, and is tricked to display (blindly) content on that (non-existent) secondary display, which is then captured. The capture software allows displaying a preview of the content of the non-existing secondary display on a window on the primary display. The benefit of this method is the ability to capture full screen presentations and still be able to see all controls of the capture process, while having only one monitor/display is connected to the computer system. This method assumes that the computer has the ability to drive a secondary monitor even though it is not connected (and may not exist). Because computer display devices may be any one of several types and configurations, the capture software allows the format of the simulated display to be configured to match that of an actual display device that may later be used to display a presentation. An advantage of this configurability is that a presentation may be created and captured for use on a display device to which the creator of the presentation may not have access prior to a presentation.

In computer software embodying the principles of the invention, the problems associated with the user having to remain actively involved in the image capture process, significant gaps in information content from one image to the next, and the problems associated with managing and distributing large files are addressed by providing a method for automatically capturing full resolution static images from a computing device without the need for any additional hardware, detecting changes to the image and automatically storing single static images when the image has changed an appreciable amount. This approach avoids capturing large numbers of identical images as is the case with a video camera but allows for captures that are frequent enough so that the images captured represent a sufficiently detailed summary of the presented material as to allow the viewer to comprehend the material.

In the present implementation of the invention, the amount of generated data is optimized by a suitable algorithm. In an exemplary embodiment of the algorithm a new full resolution static image (a picture slide) is created when the following are true:

The original picture has changed appreciably (what is reasonable may be pre-set by the user); and/or, Enough time has passed since the previous picture slide was captured (what is "enough" time may be pre-set); and/or, The picture is relatively stable (the source data has not changed very much over a predetermined period of time).

The advantages of this algorithm is that it allows the user to initiate a static image capture process using pre-set parameters and then focus on the presentation being created without having to be concerned with the mechanics of the image capture process. If the presenter or operator of the software embodying the algorithm wishes to increase or decrease the amount of detail captured, he or she may choose to adjust the parameters used by the software to determine when an image is captured and stored simply by making adjustments to these parameters from a user interface presented on the user interface of a computer or other device running the image capture software.

Further improvements may be made to implementations of the capture algorithm to improve the ease of use by implementing features such as controls that allow the operator to adjust the image capture parameters using user interface controls such as a sliding control adjustment that may simply be adjusted from more detail to less detail settings without the user having to adjust each parameter separately. Additional functions such as a view of the images being captured and indicators which display the number of images captured and total file size of the captured images may be added to further improve the operator's ability to optimize the image capture process. If the user desires to create a complete presentation, the image capture algorithm may be further combined with an interface to audio or video capture hardware to create a file that combines both an audio or audio/video recording and the images captured by the algorithm whereby the images are keyed to allow for a playback of those images displayed in synchronization to the audio or audio/video recording.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figure 1:
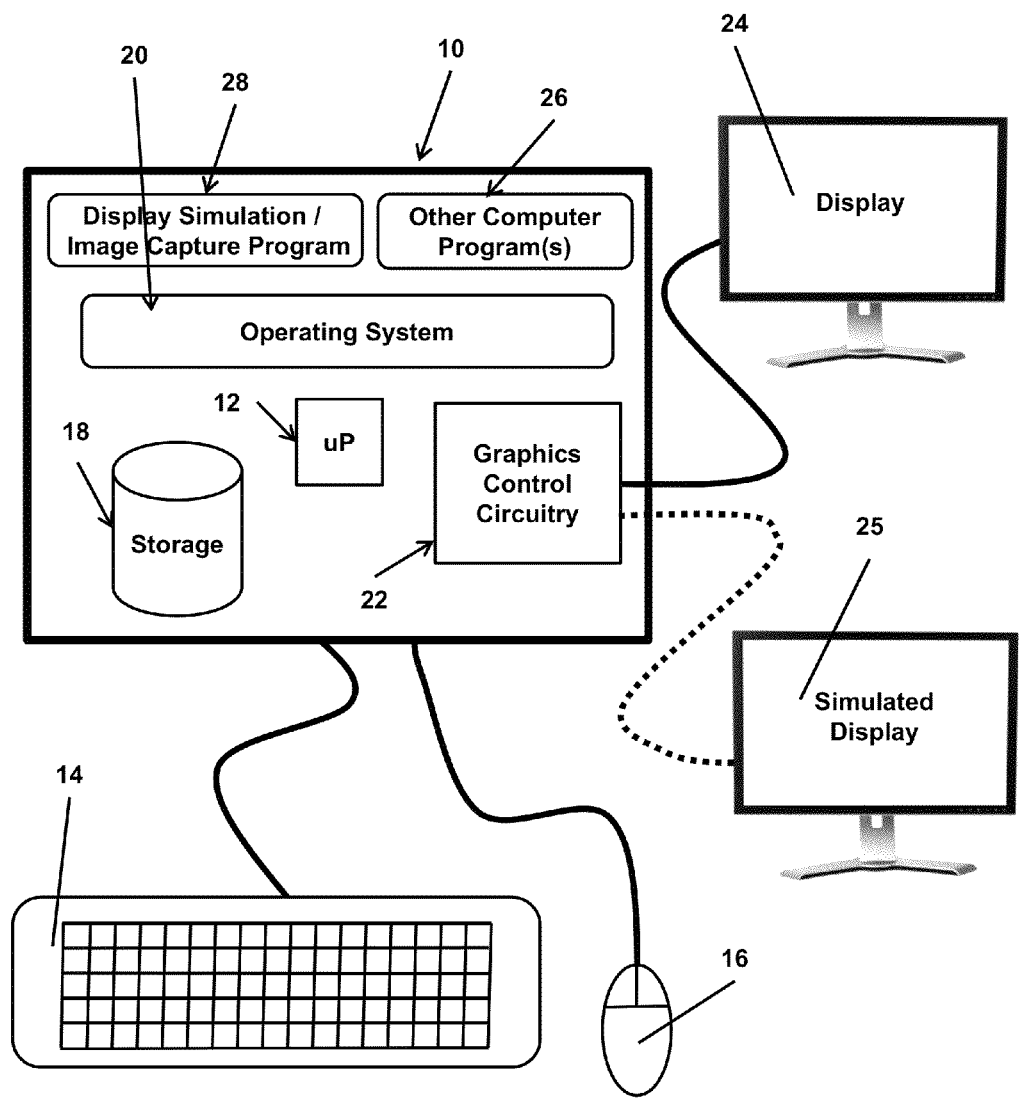
FIG. 1 is a block diagram of a representative illustration of a personal computer implementing the simulated display and image capture algorithm with an actual display and a simulated second display, according to the present invention.

FIG. 1 is a graphic block diagram showing generally a personal computer 10, which depicts a programmatic implementation of the invention. In an embodiment of the present invention, the computer may comprise a processor 12, keyboard 14, a pointing device such as a mouse 16, computer storage (storage drive) 18, a computer operating system 20, graphics control circuitry (the graphics card) that may be connected to two display devices 22, and a computer display monitor 24. Stored content or content otherwise received on a first computer device is virtually displayed as if on a secondary display, but the secondary display is not actually present. Images are captured using the process of the present invention, for display on the secondary display, without the secondary display actually being present. In this way, the captured images that form the presentation may be assembled with one computing and display device as if a secondary display was present and showing the images at that time. In a computer system as illustrated, a display simulation and image capture program 28, and various other computer programs 26 in addition to the operating system 20 will generate images which the computer operating system then directs to the graphics control circuitry 22 connected to the computer. The graphics control circuitry further processes the image data and sends it in a manner and format such that the image will appear on a primary computer display monitor connected to the computer 24 or if instructed by the operating system, the image will be directed to a secondary display device 25 which may be simulated by computer software implementing the invention. An image sent to the simulated display 25 may be shown in a portion of the primary display 24 for the user's benefit in creating the display presentation.

Figure 2:
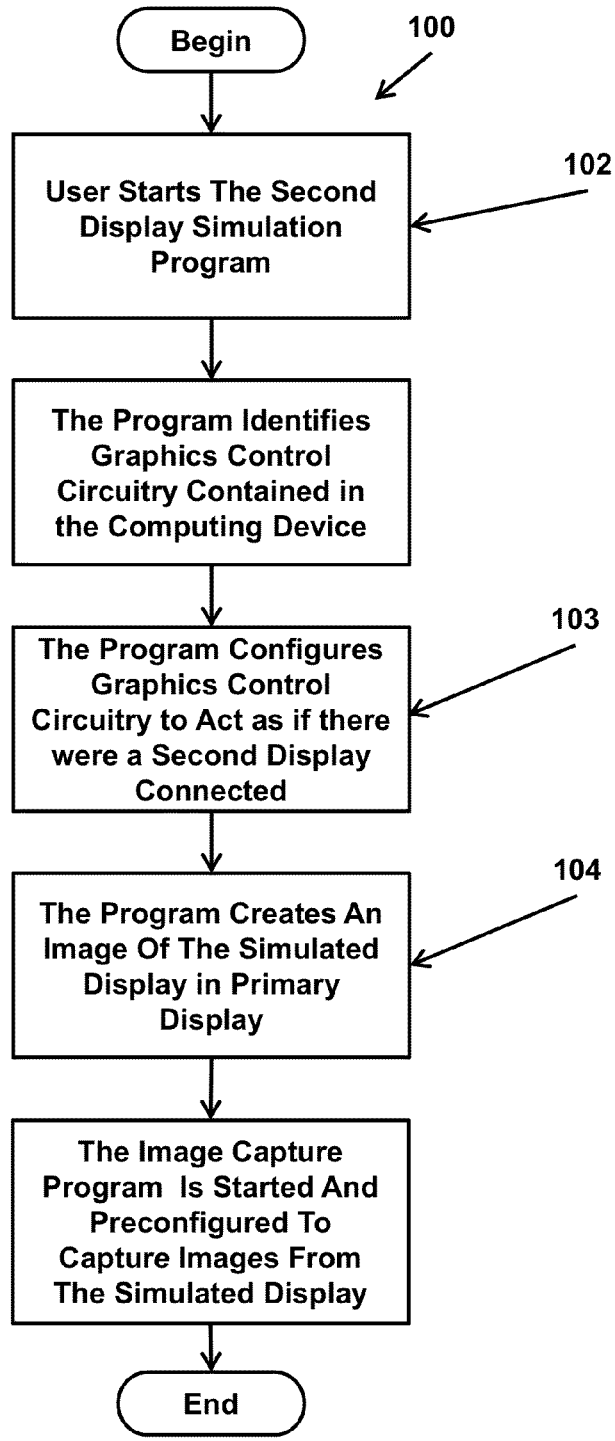
FIG. 2 is a flow diagram of an exemplary embodiment of the logic for performing the process for creating a simulated second display and starting an image capture program.

Referring to FIG. 2, which is a flow diagram of an implementation of an exemplary embodiment of the invention 100 which causes the a computer or other electronic device with a graphics card, to behave as if a secondary display device were connected when it may not be actually connected. In step 102 the user selects and starts the secondary display simulation software. When running, the software identifies the graphics card 22 contained in the device running the software. The software then sends the necessary control commands to the graphics card to trick the card into acting as if there were a secondary display connected 103. When the graphics card is acting as if there were a second monitor connected, the operating system 20 of the computing device may then be instructed by the user or other software programs to send images to this simulated display 25. The software may also send control commands to the graphics card 22 to configure the graphics card to act as if the secondary display 103 were of a type and format of monitor preselected by the user. Such a control command results in images sent to the secondary display 103 being formatted by the graphics card 22 as the user wishes them to appear on an actual display device of the type and configuration selected. Such formatting may comprise variables such as the range of colors able to be presented by a display device or the horizontal and vertical resolution and aspect ratio of the device. In such a way a user may optimize the images sent to the secondary display 103 to provide the correct level of color detail and avoid blank areas at the top and bottom or sides of an image when an image is displayed during a presentation.

An implementation of the secondary display simulation software may be configured to create a display area (window) on the primary display within which a representation of images sent to the simulated secondary display may be shown 104. When the computer software completes the steps necessary to simulate a secondary display the user may cause the image capture software to execute and thereby capture images from either the actual display or the simulated secondary display. When this image capture software is executed, an implementation of the display simulation software in conjunction with the image capture software may display the window containing the representation of the simulated secondary display 49 in the user interface of the image capture software 40. The image capture software, when instructed to start the capture process by the user, begins to monitor images that the computer operating system 20 has directed to the graphics control circuitry 22 for display on the simulated display device.

Figure 3:
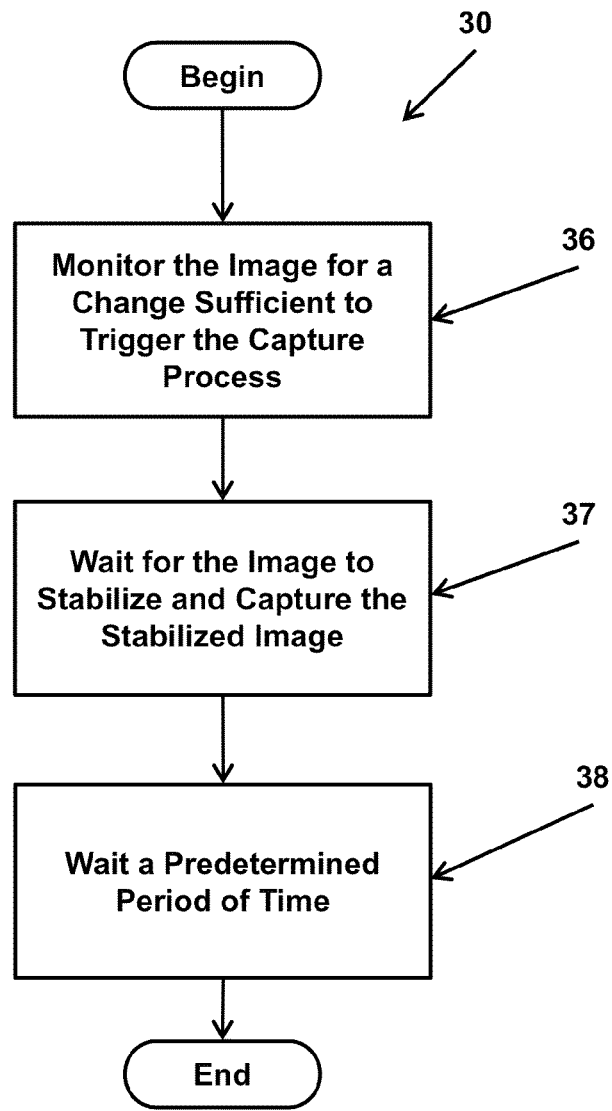
FIG. 3 is a flow diagram of an exemplary embodiment of the logic for performing the main steps of an image capture software program.

Referring to FIG. 3, which is a diagram of exemplary logic for the image capture algorithm 30 running on a personal computer. The software may be selected and initialized on such a computer or other digital device.

Figure 4:
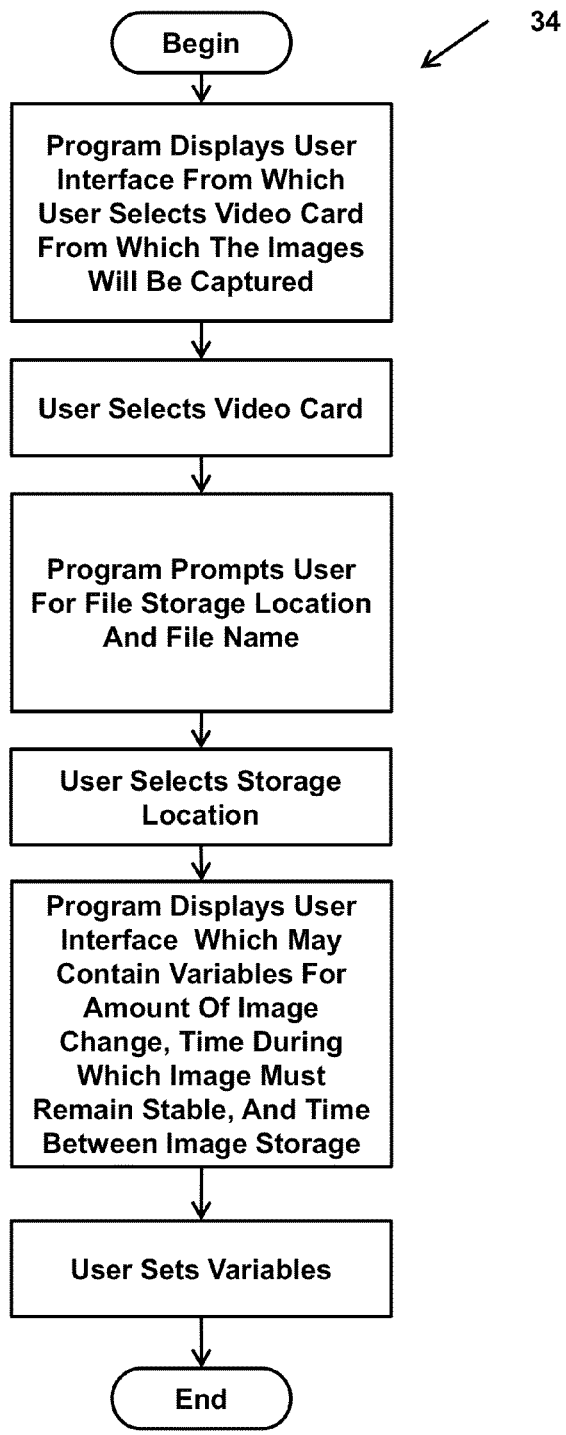
FIG. 4 is a flow diagram of an exemplary embodiment of the logic for performing the steps of initializing and displaying user interface screens of an image capture software program.

When the user of the computer wishes to capture images using software embodying the current invention, that user will select the software and cause the computer to execute or run the software. Once the software is running the software may initialize and allow the user to select values for various parameters 34 used to perform the image capture algorithm (refer to FIG. 4).

An exemplary embodiment of the computer software may display a user interface with a control or other means for the user to start the image capture process 114 or display a user interface which displays and may allow the user to adjust parameters used by the image capture algorithm 112. The user of the computer may then start the image capture process 30 or to make changes to the parameters initially established by the software. The user may also make changes to algorithm parameters while the algorithm is performing the image capture process to optimize the images being captured. Once the user has made any desired changes, the software may then wait for an instruction or change to the image which triggers the start of the capture process 36. After such an instruction or triggering event, the software may wait for the image to stabilize before capturing the image 37. These steps of waiting for a triggering event and for the image to stabilize may be repeated until the user wishes to stop the process. When the user wishes to stop the capture and storage algorithm, he or she may then instruct the software to stop the execution of the algorithm 38 and complete the storage process in such a manner as to make the collection of stored images ready for retrieval and later use.

Figure 5:
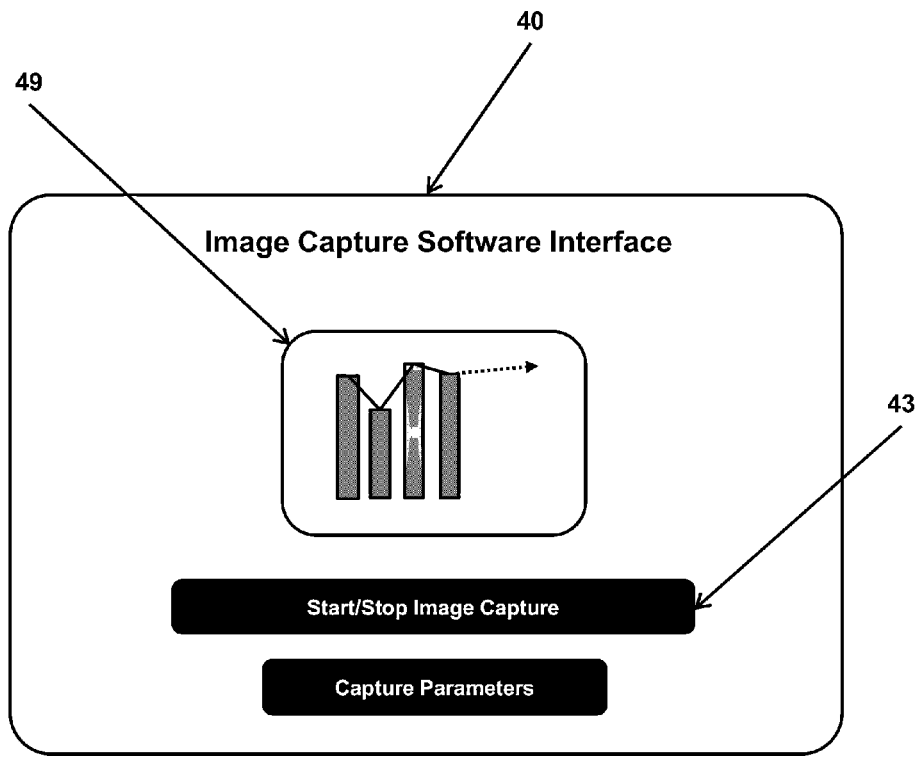
FIG. 5 is a graphical representation of an exemplary embodiment of a user interface used for an image capture program.

A possible implementation of computer software embodying the invention may initialize parameters used by the image capture algorithm to a set of default values. Referring to FIG. 5, the software may display a user interface, a possible representation of which is shown at 40. A start/stop control 43 allows a user to start and stop the capture process without any adjustments to program parameters. When implemented with the secondary display simulation software, the preferred embodiment of the invention will automatically select the simulated display device as the device from which images are captured and stored.

Figure 6:
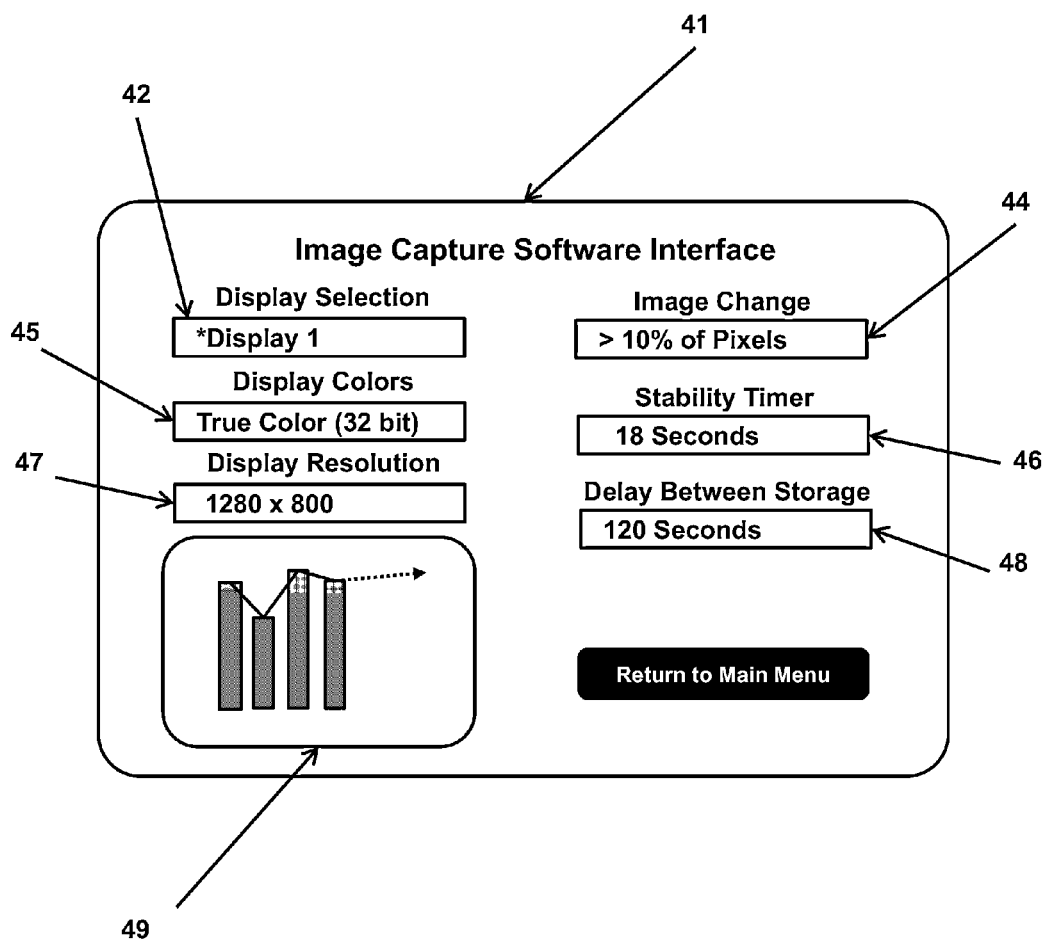
FIG. 6 is a graphical representation of an exemplary embodiment of a user interface used to adjust image capture parameters.

Referring to FIG. 6, from a parameters adjustment user interface 41, a user may have the option to select a location in which to store the collection of images captured by the image capture algorithm. The user may select the number of colors supported 45, and the resolution and aspect ratio 47 used by the graphics card when sending images to the simulated secondary display. The computer software may also provide the user with the option of making adjustments to those parameters used by the image capture algorithm to select the initial changes required in an image to trigger the capture process 44, the amount of time that such an image remains relatively unchanged after an initial change before that image is stored 46, and the time to elapse before the next image capture 48.

The three variables just discussed may be used in controlling the level of change detail captured by the algorithm and as a result, the number of images captured and stored. In a preferred embodiment of the invention, the user of the image capture algorithm may be able to adjust each variable separately to arrive at an optimal balance between the level of detail captured and the cumulative total size of the images captured and stored. The first variable, the amount of initial change to an image refers to the change that occurs to an image before the algorithm starts the capture process. This insures that the algorithm does not capture a series of images that are identical or nearly so. The user may determine how much change is desired between captures depending upon the type of material being captured and set this variable accordingly. The second variable, the amount of time that the image remains relatively unchanged after the initial change before the image is stored, serves to insure that an image is not in a state of change when it is stored. The purpose of this variable is to prevent partially formed images from being captured and stored. The user may also determine, based upon the type of images being captured, how long an image shall remain unchanged before it is stored. The third variable is the amount of time that elapses between an image storage and the start of the next storage process. This variable is used to control the maximum number of images stored for a given time period and has the effect of providing the maximum storage capacity occupied by the series of captured and stored images.

Figure 7A:
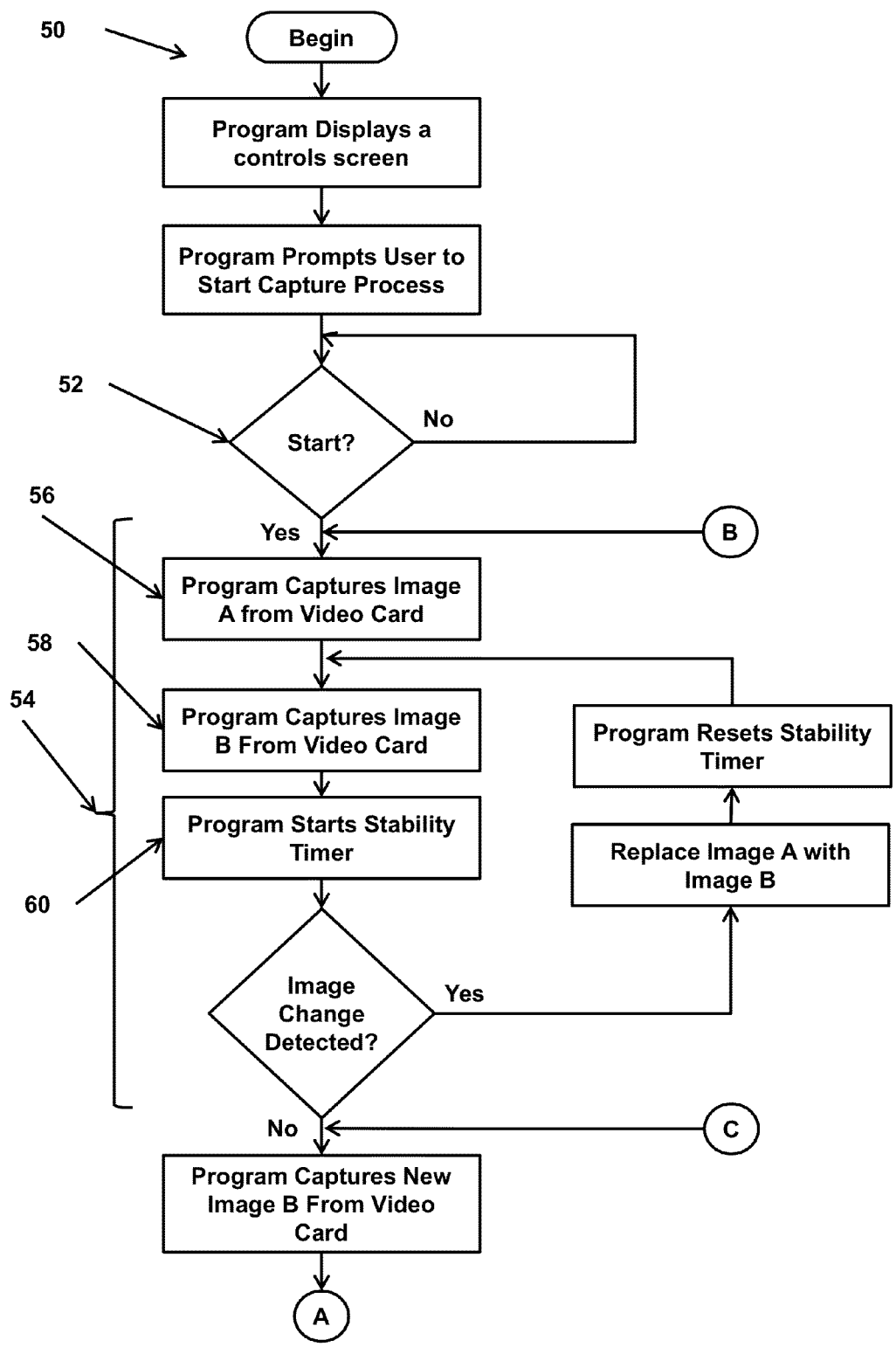
FIGS. 7A-7C are flow diagrams of an exemplary embodiment of the logic for performing the steps required of an image capture algorithm.
Figure 7B:
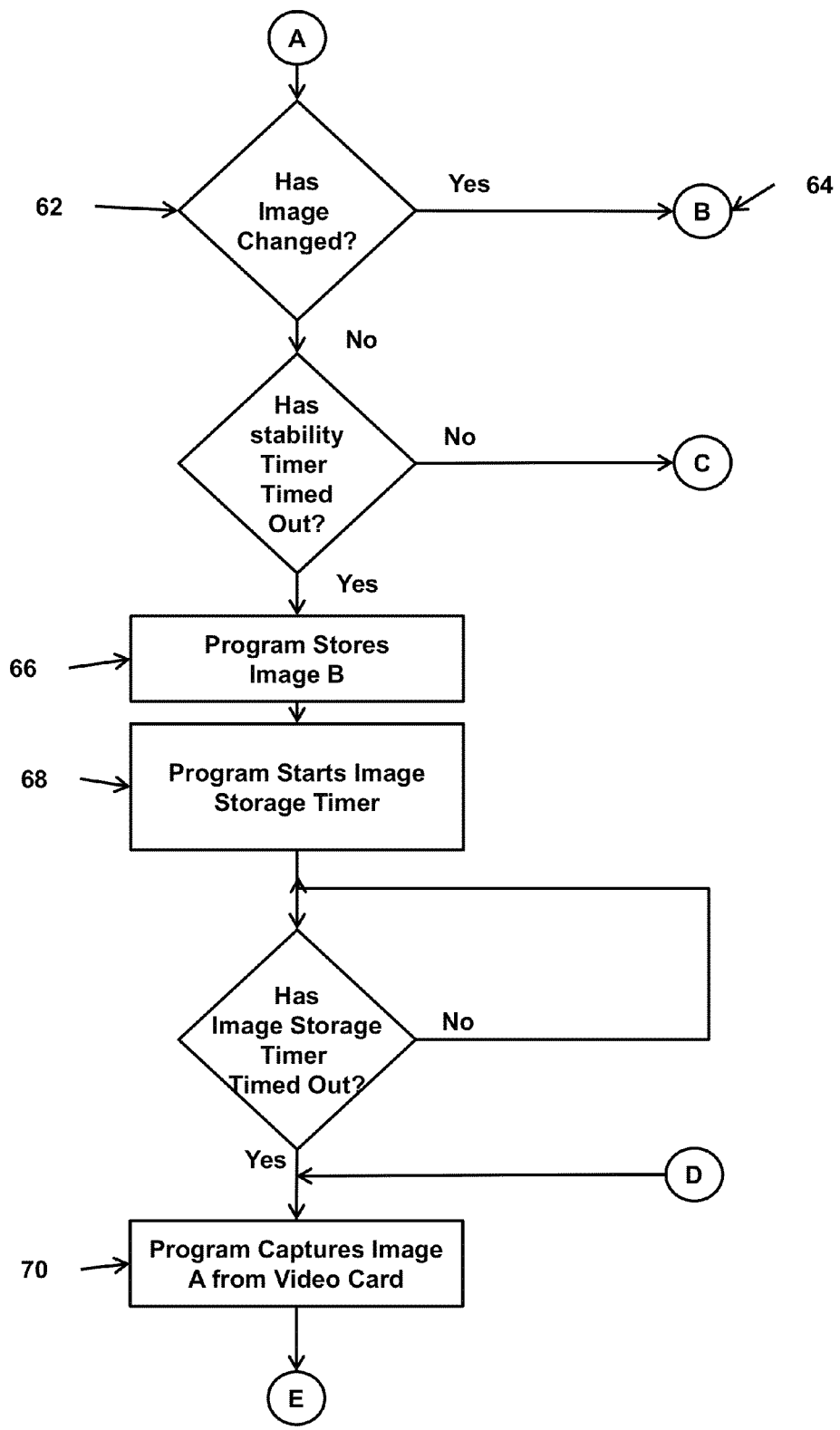
Figure 7C:
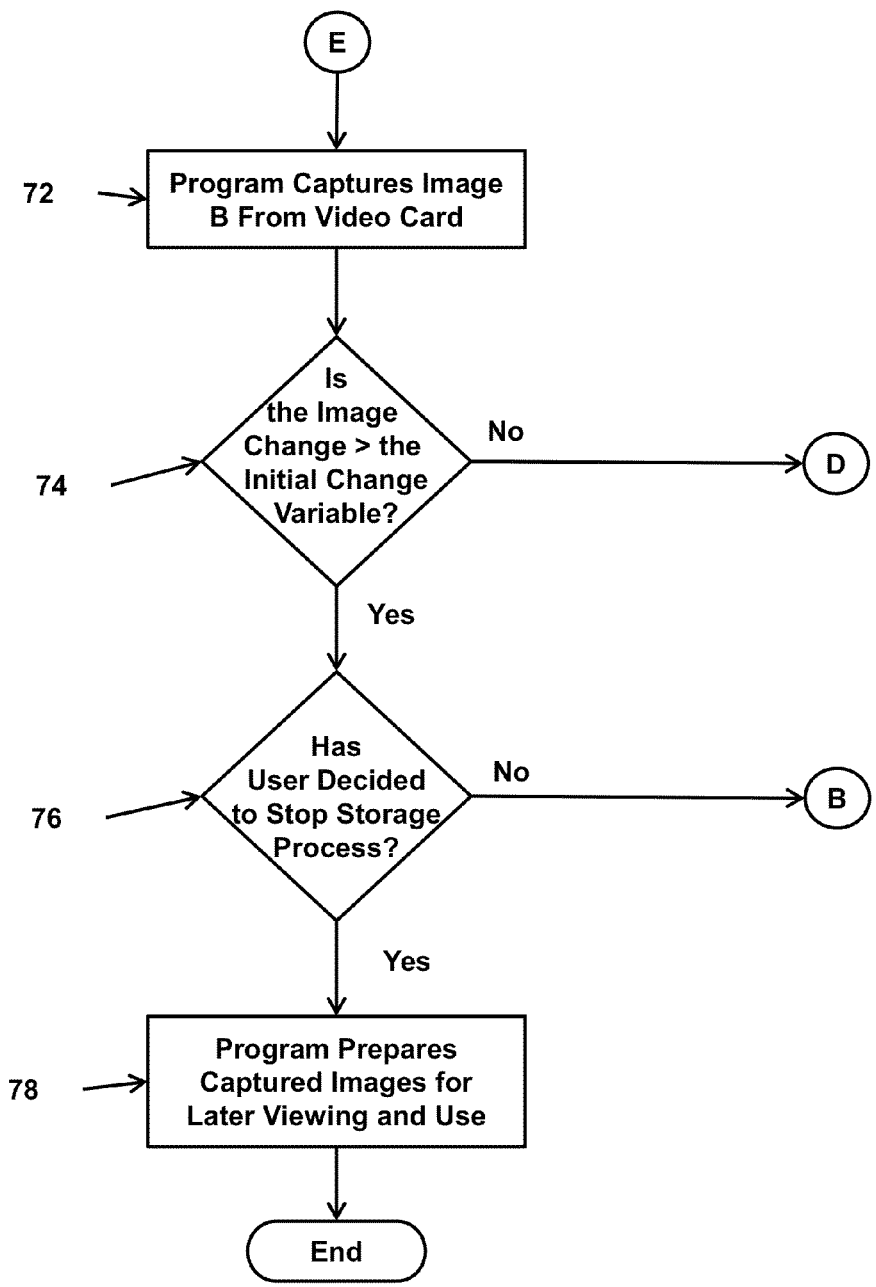

Referring to the flow diagram of FIGS. 7A-7C which illustrates a possible embodiment of the invention 50, the computer software may display a control screen and wait for the user to initiate the image capture process 52. This may be done by the selection of a control on the user interface but may also be done with a keystroke or other such manner as the user may find convenient.

In order to optimize the number of images captured and stored, the algorithm waits for images to become stable before it captures and stores them 54. Because software implementing the image capture algorithm monitors changes to the image over time as part of its analysis process, this exemplary software implementation uses two images which will be referred to as Image A and Image B. When the user initiates the image capture process, the computer software captures an image from the graphics control circuitry and stores this image as Image A 56. The software may then capture a second image from the graphics control circuitry and store that image as Image B 58. The software then starts a timer used to determine if the image is stable (Stability Timer) 60.

When the computer software has acquired Image A and Image B, a program is run which compares Image B with Image A 62. The program determines if there has been a change between the two images that exceeds a predetermined amount. If such a change is detected, the algorithm may determine that the image is not stable and wait for it to stabilize before it is stored 64. If such a determination is made, the algorithm replaces Image A with Image B, resets the Stability Timer, and captures a new Image B. The algorithm then starts the Stability Timer. This process is repeated until there is not a change that exceeds the aforementioned predetermined amount from Image A to Image B.

When there is no change detected, in other words, the algorithm determines that the image remains stable from one comparison to the next, the algorithm continues to monitor the images for change until the Stability Timer reaches an amount of time that the user has selected (times out), meaning that the image is stable enough for capture and storage. If the image changes before the Stability Timer times out, the process starts anew 64. If the image is stable enough for storage, the algorithm stores Image B in the file location chosen by the user 66.

After an image is stored, the algorithm starts a second timer used to determine the amount of time between image storage (Image Storage Timer) 68. When the Image Storage Timer expires, the software captures a new Image A 70 and then a new Image B 72 and compares the two images to determine if there has been a change that exceeds the predetermined amount of initial change variable discussed above 74. If there has not been a change that exceeds this amount, a new Image B is captured and compared against Image A. This process continues until a change is detected that exceeds the amount specified by the initial change variable. When this occurs, the process of waiting for the image to stabilize 54.

This entire process; initial change detection, image stability monitoring, image storage, and time delay between storages, repeats until the user wishes to stop the image capture process 76. When the user wishes to stop the capture process, the software stops running the image capture algorithm and prepares the captured images 78 so that they may later be viewed and manipulated by the user as he or she sees fit.

In another embodiment of the invention, the user may run the image capture software as described above but the software has the additional capability of recording audio or audio/video files using hardware that may be connected to or otherwise available to the processor of the computer or electronic device. The capture software in this embodiment may encode information that identifies the capture times of each captured image such that the images can later be viewed in a manner that is synchronized with the audio or audio/video files recorded. An example of how this embodiment may be used would be to generate a presentation that not only includes a series of screen images but also an audio or audio/video recording of what is said or demonstrated along with each image.

Figure 8:
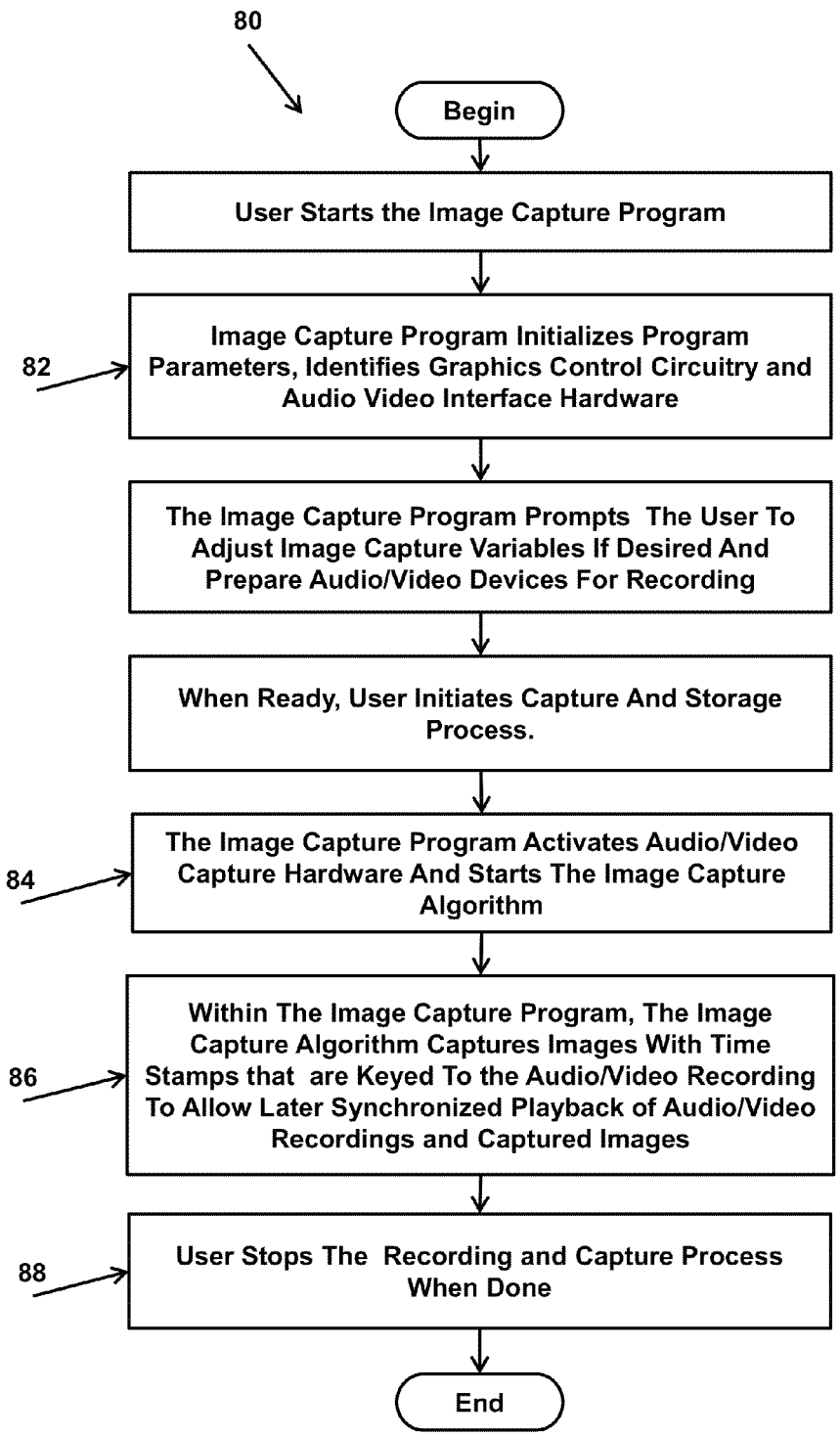
FIG. 8 is a flow diagram of an exemplary embodiment of the logic for performing the main steps of synchronizing captured images with an audio or audio/video recording, according to the present invention.

Referring to FIG. 8, a series of exemplary steps to accomplish this embodiment is shown at 80. The image capture software is started by the user. The software then initializes software parameters, including those variables used by the capture algorithm, and identifies the video graphics card or cards available for image capture 82. To enable the audio or audio/video capabilities, the software then identifies connected audio or audio/video capture circuitry depending upon which type of recording is to be captured. The image capture software displays a user interface and prompts the user to make any desired adjustments to the image capture variables and prepares the connected capture circuitry for recording.

When the user is ready to start the audio or audio/video recording and image capture process, the user may instruct the image capture software to start the capture process. When this instruction is given, the image capture software activates the audio or audio/video capture hardware and starts the image capture algorithm 84.

The image capture algorithm then runs in the same manner as previously detailed but with the additional step of adding time stamps to each captured image 86. These time stamps are keyed to the audio or audio/video file that is being recorded. These time stamps allow additional software to display the captured images in a manner that is synchronized to the playback of the audio or audio/video recording as may be the case.

When the user has completed the image capture and audio or audio/video recording, the user may instruct the image capture software to stop the image capture process 88. At this time, the software will also instruct the audio or audio/video recording hardware to stop recording and prepare the associated files for later use as desired.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for creating a simulated second display and capturing and storing images from the simulated display comprising:
   a computing device comprising a processor, a storage system, and graphics control circuitry capable of connection to at least two computer display monitors;
   a first primary computer display monitor, capable of being connected to said graphics control circuitry, associated with and in electronic communication with said computing device for display of information contained in said graphics control circuitry;
   a simulated second computer display monitor in simulated connection with said graphics control circuitry when such second computer display monitor is not actually connected to said computing device; and
   an image capture device in electronic communication with said computing device which monitors a stream of images directed from the computing device to said simulated second display monitor and stores one or more individual images upon the satisfaction of predetermined capture conditions which comprise a change to the monitored images which exceeds a predetermined amount, said capture conditions further comprise, after said initial change, the monitored images remaining predominantly unchanged for a period of time before each storage.

2. The system of claim 1, wherein:
   said capture conditions further comprise a predetermined period of time that elapses between each image storage.

3. The system of claim 1, further comprising:
   an audio recording device connected to and in electronic communication with said computing device where an audio recording may be captured simultaneously with said storage of one or more images.

4. A method of comprising he steps of:
   capturing and storing images from the graphics control circuitry of the system of claim 3;
   simultaneously capturing audio recordings from the audio recording device of claim 3; and
   storing the images and audio recordings in a manner that permits the stored images to be displayed in synchronization with a replay of the audio recordings.

5. The system of claim 3, wherein:
   said audio recording device further comprising the capability of recording a stream of video images is connected to and in electronic communication with said computing device where a video recording is captured simultaneously with said storage of one or more images.

6. The method of claim 4, further comprising the steps of:
   simultaneously capturing video recordings from the video recording device of claim 5; and
   storing said images and video recordings to be stored in a storage device in such a manner that they may be replayed such that said stored images are displayed in synchronization with replay of the video recordings.

7. A method comprising the steps of:
   capturing and storing images from the graphics control circuitry of the system of claim 1 when the following conditions are present:
   an image has changed by a user selectable amount;
   a user selectable period of time has passed since the last image was captured; and
   the image is not currently undergoing a substantial change.

8. A method of simulating a computer display monitor, comprising the steps of:
   connecting electronically a graphics control circuitry to at least one simulated computer display monitor which is not connected to the system;
   communicating information comprising a signal or command to said graphics processing circuitry which causes said graphics processing circuitry to send data of images to said simulated computer display monitor, as viewed from a primary display monitor that is connected to said graphics control circuitry;
   monitoring a stream of images present in the portion of said graphics control circuitry associated with said simulated computer display monitor; and
   capturing and storing an image from such stream of images when a predetermined amount of change is detected in the image being monitored and said image remains predominantly unchanged for a period of time.

9. The method of claim 8, wherein:
   said amount of change required before said image is captured is variable.

10. The method of claim 8, wherein:
    said amount of time that an image remains predominantly unchanged prior to capture is variable.

11. The method of claim 8, further comprising the step of:
    waiting for a predetermined period of time to elapse after capturing and storing of an image before the start of the capture and storage process for an additional image.

12. The method of claim 11, wherein:
    said amount of time elapsing before the start of the next capture and storage steps is variable.

13. The method of claim 8, further comprising the step of:
    displaying a user interface on a computer display monitor associated with and in electronic communication with said system, which includes a representation of the last image captured and stored.

14. The method of claim 13, further comprising the step of:
    displaying, in said user interface, variables which are adjustable to vary the parameters of said image capture method.

* * * * *

UNITED STATES PATENT AND TRADEMARK OFFICE
CERTIFICATE OF CORRECTION

| | | |
|---|---|---|
| PATENT NO. | : 9,007,383 B2 | Page 1 of 1 |
| APPLICATION NO. | : 13/705985 | |
| DATED | : April 14, 2015 | |
| INVENTOR(S) | : Ivo Martinik | |

It is certified that error appears in the above-identified patent and that said Letters Patent is hereby corrected as shown below:

In the Claims:
Claim (4) Col. (9) Line (36)
Please delete "he" and insert --the--.

Signed and Sealed this
Eighth Day of September, 2015

Michelle K. Lee
*Director of the United States Patent and Trademark Office*